J. H. GLAUBER, DEC'D.
THE CITIZENS SAVINGS & TRUST COMPANY, EXECUTOR.
FAUCET.
APPLICATION FILED DEC. 16, 1912.

1,286,286.

Patented Dec. 3, 1918.
2 SHEETS—SHEET 1.

ATTEST
E. M. Fisher
J. C. Mussun.

INVENTOR
JOSEPH H. GLAUBER
BY Fisher & Moart ATTYS.

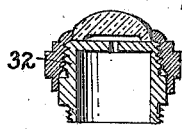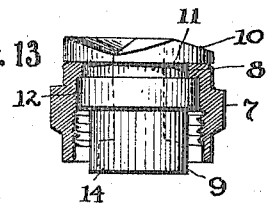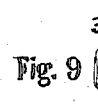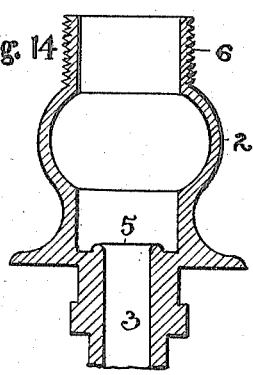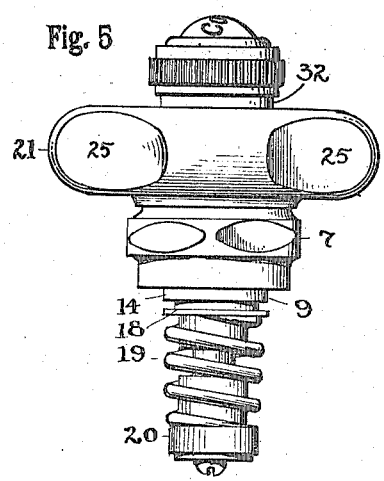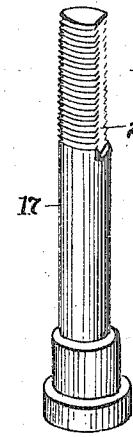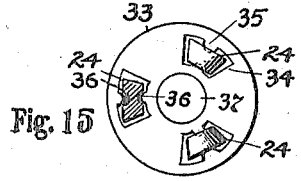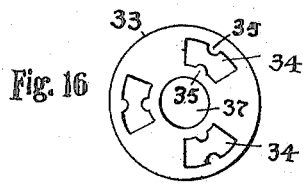

UNITED STATES PATENT OFFICE.

JOSEPH H. GLAUBER, OF CLEVELAND, OHIO; THE CITIZENS SAVINGS & TRUST COMPANY EXECUTOR OF THE ESTATE OF SAID JOSEPH H. GLAUBER, DECEASED.

FAUCET.

1,286,286.   Specification of Letters Patent.   Patented Dec. 3, 1918.

Application filed December 16, 1912. Serial No. 736,976.

*To all whom it may concern:*

Be it known that I, JOSEPH H. GLAUBER, citizen of the United States, residing at Cleveland, in the county of Cuyahoga and State of Ohio, have invented certain new and useful Improvements in Faucets, of which the following is a specification.

This invention appertains to improvements in faucets, basin cocks, bibs, or other like devices used for lavatory, laundry or drinking purposes, and particularly in that class of faucets styled self-closing in which the valve is opened by a partial rotation of the handle and is closed by a strong spring and wherein rollers or balls ride between opposed inclines to lift the valve stem and its handle. Briefly stated, the improvements reside; first, in the escalloped ellipsoidal handle which affords a good hand grip to overcome the action of the spring notwithstanding the highly finished and smooth exterior of the handle; second, in the union nut and the bonnet which coöperates with the handle in giving different settings for the handle and permits quick and convenient removal of the valve from the faucet body without dismantling the handle and its working parts; third, in the locking means for securing the handle, bonnet, union nut and valve stem parts together so that a fine and reliable adjustment and setting of the parts may be made in assembling the faucet and in taking up wear; fourth, in the spring washer or its equivalent which provides for a limited play of the handle axially of the stem while affording sufficient tension to prevent a loose or wabbly connection; and fifth, in an effective and durable combination of solid rollers and a separator carrier disk which will permit individual removal and replacement of the rollers while also adapting all the rollers to be safely held for common removal and handling.

Figure 1:
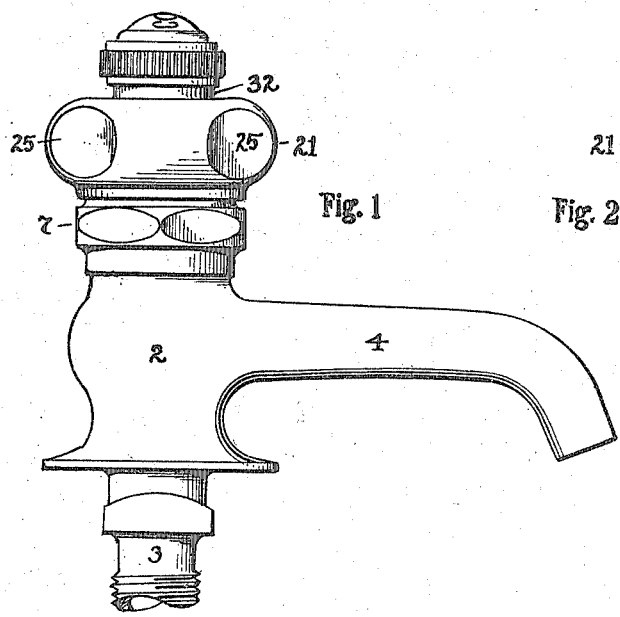
Figure 2:
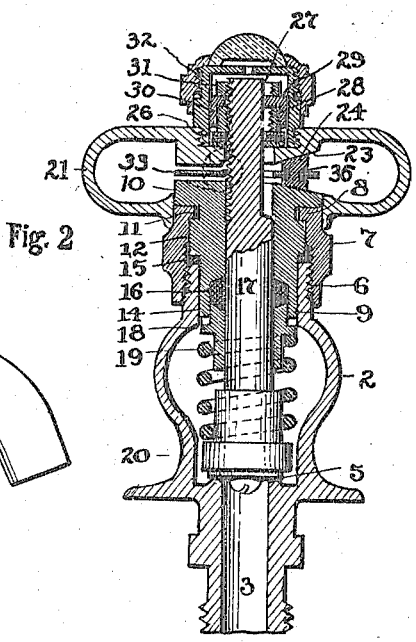

In the accompanying drawings, Figure 1 is a side view of a faucet embodying my improvements, and Fig. 2 is a central vertical section through the faucet viewed at right angles to Fig. 1.

Figure 3:
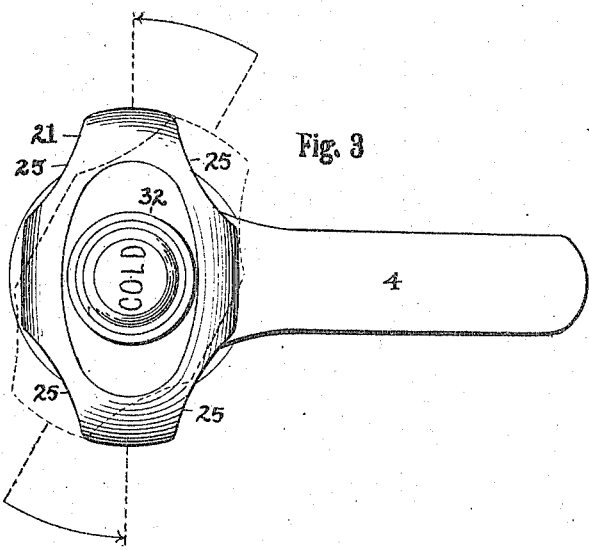
Figure 4:
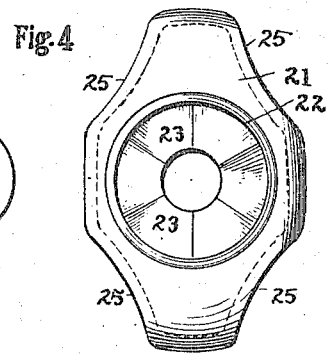

Fig. 3 is a plan view of Fig. 1, and Fig. 4 is a bottom view of the handle alone. Fig. 5 is an elevation of the handle, union nut and valve stem in their assembled relations and as they appear when bodily removed from the faucet.

Fig. 6 is a sectional view of the index and cap for the handle, and Figs. 7, 8, 9, 10, 11 and 12 are perspective views of the locking and bearing members and the valve stem. Fig. 9 shows the same member illustrated in Fig. 8, but inverted. Fig. 13 is a side view of the bonnet and a sectional view of the union nut in its permanently united relation therewith. Fig. 14 is a sectional view of the body. Fig. 15 is a plan view of the rollers and disk carrier, one of the rollers being in section. Fig. 16 is a plan view of the disk carrier with the rollers removed therefrom.

The faucet comprises a chambered body 2 having an intake end 3, a discharge spout 4, a valve seat 5, and an externally-threaded extension 6. An internally-threaded nut 7 is screw-engaged with this extension 6, and an inturned flange 8 at the upper end of nut 7 affords a permanent rotatable engagement for the nut with a bushing or bonnet member 9. This member comprises an enlarged head 10 provided with a succession of elevations and depressions annularly at its top, an annular groove 11 next beneath said head, an annular seating portion 12 of approximately the same diameter as extension 6, and a reduced extremity 14 made to fit snugly within extension 6. A sealing washer 15 is interposed between seating portion 12 of member 9 and the upper end of extension 6, and a differential bore 16 centrally of this member affords a bearing and a packing seat for the valve stem 17 and its gland member 18. A coiled spring 19 is mounted upon the stem between gland member 18 and the valve head 20, and the strength of this spring must be ample to resist the pressure of the water and avoid leakage at the seat 5.

The means for lifting the valve stem against the tension of the spring comprises a rotatable handle 21 detachably and adjustably secured to the upper end of the valve stem and having a flanged opening 22 in its bottom adapted to sleeve over both the head 10 of the bonnet and the upper rounded end of the union nut 7, thereby covering and protecting the joint between the said two parts. As shown the handle is hollow and provided with a succession of elevations and depressions 23 upon its inner upper portion and a set of tapering rollers 24 occupy the depressions with a very slight loose play when the valve is seated. The stem 17 extends through the handle which is particularly distinguished in construction in that it is an ellipsoidal body preferably provided with four large flat escallops 25 in its rounded edges, the vertically-flattened faces 25 being oppositely paired at the longer ends of the handle. The object in making the handle with this peculiar configuration is many-fold; cleanliness is conserved, a smooth and polished finish is easily obtained in the original making and also permanently maintained without difficult labor at all times thereafter, and an extra firm finger-grip and hand-hold is made possible which permits positive rotation of the handle regardless of the resistance of the strong spring 19 and the frequent experience of a slippery, soapy hand-engagement, but the hand-hold surfaces are such that it is not convenient or practicable to affix or tie something thereto to hold the handle open for a wasteful flow of water. The handle is also unusually attractive in its ornamental aspects, but this is a matter of design and is incidental to the useful and serviceable qualities set forth.

The locking means for the handle consists of four parts affixed or sleeved to the threaded end of the valve stem, that is, a spring-coil bearing washer 26, Fig. 11, which has a D-shaped opening or is of D-shape to slidably lock with the flat-faced portion 27 of the valve stem; a hexagon nut 28 to screw-engage the threaded portion of the stem and to fix the position of the washer in bearing engagement with the handle; a round member 29 having a D-shaped opening to slidably lock with the flat-sided portion 27 of the stem and provided with two prongs or segmental projections 30 which are flat inside to sleeve snugly over two sides of nut 28; and a second thinner lock nut 31 to screw upon the stem and hold the locking member 29 in place. Nut 31 may be omitted, especially if the valve stem is shortened and the index-holder or screw cap 32 is made of less height so that member 29 will have only a limited end play and be prevented from disengagement from nut 28, say when the faucet is inverted. Axial adjustment of the said locking parts on the stem is desired for two reasons; first, to fix the tension of the spring; and second, to take up wear at either the valve-seat, the rollers 24 and their bearing surfaces, or the bearing washer 26. One-sixth of a rotation of nut 28 gives a very fine adjustment and locking member 29 is slidably affixed to the stem to release the nut, and after one or a multiple of such rotations to lock therewith again. Arbitrary requirements limit the size and relative strength of these parts, and also dictate the material used, generally a soft and non-corroding material such as brass; and therefore, I make the round locking member 29 and the interior of screw cap 32 of approximately the same diameter so as to provide a backing or sustaining body for the projections 30, thereby guarding them against lateral strain, twist and breakage. The function of the spring washer 26 is to prevent loose or a wabbly play of the handle on the valve stem, but its tension is of course secondary to that of spring 19 and in no manner interferes with the seating of the valve which must have an independent limited axial movement in respect to the handle to permit closure at the valve seat, not only when the valve is new but also in use as the valve seat wears. The limited room within the screw cap 32 is one reason why I prefer to employ the D-shaped spring 26 as a bearing washer in lieu of a separate washer and spring, an arrangement which might also be used if compactness is of no importance.

The rollers 24 which sustain all the strain of operations and the full tension of the spring is another part of the faucet which has been especially devised for strength and durability in connection with a separator and carrier disk 33. Thus, in Figs. 15 and 16 I show a relatively thin disk of spring metal having openings 34 radially therein with rounded lips 35 projected inwardly and toward each other from the opposite curved edges of each opening. These openings are adapted to receive the wide-bearing rollers 24, and the lips 35 and their narrow supporting parts of the disk are adapted to be flexed in a greater or less degree to permit the rollers to be individually inserted and removed, each roller having convex depressions 36 in the sides thereof adapting the roller to rotate and even rock thereon. The central opening 37 in the disk is larger than the valve stem, and permits the disk with its affixed rollers to be bodily removed and replaced in assembling or dismantling the faucet. Each roller, although having stock removed at its sides, is nevertheless solid to sustain the end thrust communicated thereto by the strong spring, and the slight engagement of the lips 35 with the rollers is sufficient to hold the rollers in place without appreciable friction or bind, thereby making a very efficient and durable combination of parts for performing the primary functions of these members.

Now reverting to the combined union nut and bonnet, these two members are rotatably united and constructed in detail as described so that the faucet may be easily dismantled and reassembled by unskilled persons without altering or disturbing fixed adjustments between the handle, valve stem and said nut and bonnet, see Fig. 5 which shows the said parts bodily removed from the faucet body but otherwise intact. The fact that the union nut 7 is independently rotatable in respect to the bonnet and handle, although carried in fixed relation therewith, permits the handle, bonnet and stem to be rotatably adjusted and set in various positions on the faucet body. This is indicated in Fig. 3 wherein the dotted and full lines of the handle show two different settings of the handle to meet different conditions in a lavatory connection.

An adjustable setting is of advantage in faucets or cocks used in inverted positions; in faucets having lever handles; in faucets where the setting is necessarily close to a wall; when rotation of the faucet body is required in setting operations; in setting faucets right and left hand on a lavatory basin or sink, and in handles having indicating characters permanently fixed thereon. The riding surfaces for the rollers being on both the bonnet and the handle, these two parts must be jointly revolved in setting operations to preserve their proper working relations. This is made possible by the use of the union nut 7, and this nut may be made either of cast or drawn metal, whereas the bonnet may be made of hard or special metal to take the wear of the traveling rollers. The bonnet extension 14 fits snugly within the body extension 6 and the union nut screws upon the outside thereof, thereby providing a double reinforcement for the threaded extension which safe-guards it from splitting and leakage. Extra washers 15 may also be used at the outset within the nut 7 so as to raise the handle and valve parts, especially if the tension of the spring 19 is excessive for any given water connection. These extra washers can be removed at any time to permit additional screw-pressure to be applied through the union nut to increase the tension of the spring. This can be done to advantage from the standpoint of appearance also as the washers and joint will be concealed by the nut.

The use of a connected bonnet and nut permits assembling of all the working parts of the faucet in exactly the proper working relations for any style of body before installing them in their final position in the body, and at the same time permits rotatable adjustment and setting of the handle in any desired position on the body. This is an advantage to the manufacturer, plumber, and the public.

What I claim is:

1. In a faucet, a valve having a stem, a spring tending to close the valve, a bonnet member, a union nut, a handle, and adjustable means to lock said handle in sleeved adjustable relations with said bonnet member and the union nut, and said bonnet member being secured solely by said union nut for rotatable adjustment thereof and the parts carried thereby.

2. In a faucet, a chambered body having a threaded extension, a valve and stem therefor, a union nut to screw-engage said extension, a bonnet member rotatably mounted upon said extension and rotatably united to and jointly removable with said union nut, and a hollow handle for said stem in sleeved engagement with both said nut and member.

3. In a self-closing faucet, a chambered body, a valve and stem therefor, a bonnet sleeved upon said stem and rotatably seated in loose sleeved relation with said body, a union-nut rotatably secured to said bonnet and adapted to screw-engage with said body, a handle rotatably mounted upon said stem and bonnet and union-nut, means between said handle and bonnet coöperating with a spring to produce an axial movement of said stem, and adjustable locking means to secure said handle and stem together.

4. In a faucet, a threaded valve stem, a handle, and adjustable means to rotatably secure said handle upon said stem, comprising a nut, a pronged member having interlocking engagement with said stem and said nut, and an inclosing body fitted snugly over said pronged member to provide a sustaining backing therefor.

5. In a self-closing faucet, a valve and a flat-sided stem, a separate bonnet and handle sleeved to rotate independently upon said stem, a strong spring between said bonnet and valve to press the valve upon its seat, a flat coiled spring having a central D-shaped opening to engage the flat-sided stem and adapted to bear upon said handle, and locking means to adjustably secure said parts together.

6. A self-closing faucet having a fixed part with inclines, a valve member and a rotatable handle therefor and rollers for said handle provided with side concavities, in combination with a separator disk for said rollers having radially-alined spring lips adapted to seat loosely within said roller concavities.

7. A self-closing faucet having a fixed part with inclines, a valve member and a handle mounted to rotate thereon, and conical rollers to support said handle having concave depressions at both ends thereof, in combination with a separator member for said rollers comprising a disk having openings radially therein with rounded lips projected inwardly from the opposite edges of each opening, said lips being adapted to seat loosely within the said depressions in the ends of the said rollers.

In testimony whereof I affix my signature in presence of two witnesses.

JOSEPH H. GLAUBER.

Witnesses:
F. C. MUSSUR,
E. M. FISHER.